J. R. CLARK AND H. A. FLOGAUS.
STEERING GEAR.
APPLICATION FILED DEC. 20, 1920.

1,415,798.

Patented May 9, 1922.

Inventors
James R. Clark
Howard A. Flogaus
by
Owen, Owen & Crampton

UNITED STATES PATENT OFFICE.

JAMES R. CLARK AND HOWARD A. FLOGAUS, OF TOLEDO, OHIO.

STEERING GEAR.

1,415,798.  Specification of Letters Patent.  Patented May 9, 1922.

Application filed December 20, 1920. Serial No. 431,834.

*To all whom it may concern:*

Be it known that we, JAMES R. CLARK and HOWARD A. FLOGAUS, citizens of the United States, and residents of Toledo, county of Lucas, and State of Ohio, have made an Invention Appertaining to a Steering Gear; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to automobile steering gears and it has for its object to provide mechanism for shifting the connecting bar which interconnects the stub axles of the front wheels of a truck or automobile, with perfect ease and without any play or lost motion in order that the truck or automobile may be easily steered while in motion. The invention has for its object other features and advantages which will appear from the following description and upon examination of the drawings.

The invention may be contained in structures of different forms used for steering conveyances of different kinds. To show a practical application of the invention, we have selected a construction containing it and will describe it hereinafter. The structure selected for illustrative purposes, is shown in the acompanying drawings.

Figure 1:
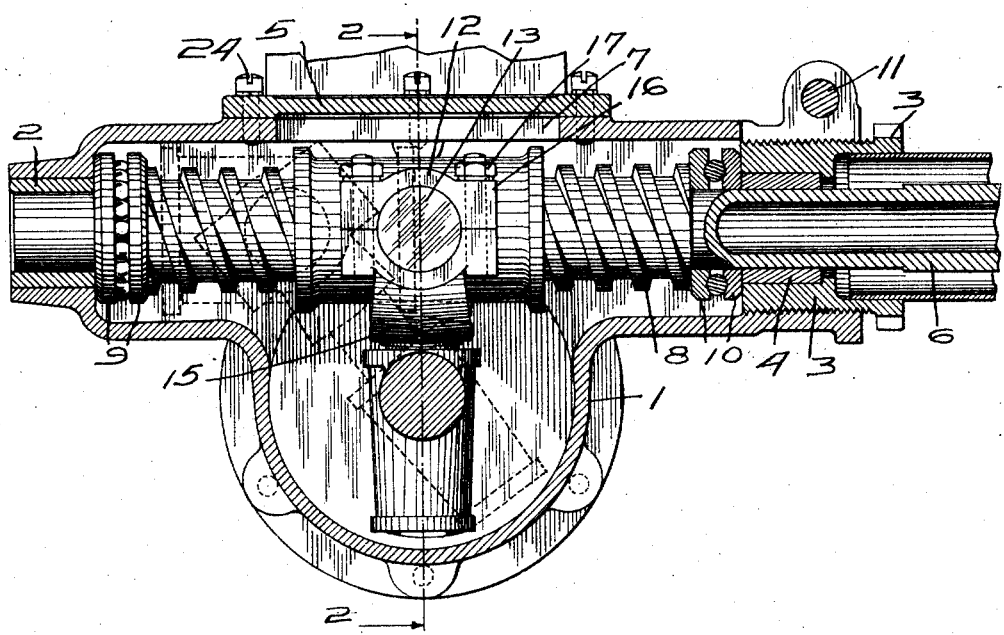
Figure 2:
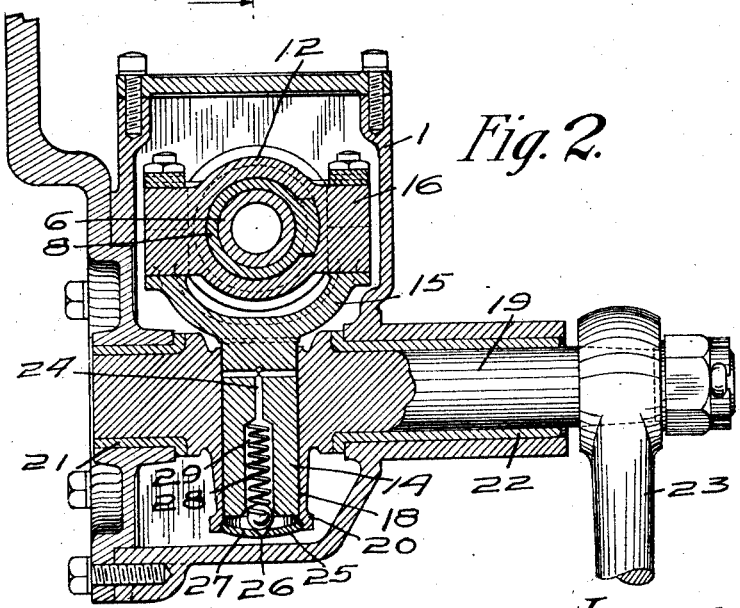

Figure 1 of the drawings, is a longitudinal sectional view showing parts of the mechanism in full. Fig. 2 is a transverse sectional view of the gearing, with parts of the mechanism in full, taken on the line 2—2 indicated in Fig. 1.

1 in the figures, is a shell or casing in which the gearing is supported. At one end it has the bearing or bushing 2, the other end is split and also is threaded. It is provided with an opening large enough to receive parts of the steering gear. The opening is closed by the threaded bushing 3, which is also provided with the bushing or bearing 4. The shell 1 has a cover plate 5 secured to the shell by means of the bolts 24. The cover plate 5 closes an opening 7 which is large enough to permit other parts of the mechanism to be inserted in the shell 1.

The shaft 6 is supported in the bearings 2 and 4. It is provided with a worm 8 that may be forced on the shaft with great pressure in order to secure the shaft and the worm together. If desired, the worm 8 may be made integral with the shaft. The shaft 6 is also provided with thrust bearings 9 and 10 located at opposite ends of the shell 1. When the worm 8 has been inserted in position, the threaded bushing 3 is screwed down so as to secure the proper adjustment of the thrust bearings 9 and 10 and so as to secure the shaft 6 from any endwise movement by reason of the operation of the worm 8 on other parts of the mechanism. When proper adjustment has been secured by the threaded bushing 3, the split end of the shell 1 may be clamped by means of the bolt 11 in the manner well known in the art, so as to tightly clamp the end of the shell 1 about the threaded bushing 3 and thus to lock the threaded bushing 3 in its adjusted position.

The worm 8 extends through a block 12 which is provided with trunnions 13 that extend outward from opposite sides of the center of the block. The axes of the trunnions 13 are located at right angles to the axis of the block 12 and consequently at right angles to the axis of the worm 8. A pin 14 having a yoke 15 is located in the shell 1. The ends of the yoke are provided with bearing members 16 in which the trunnions 13 are located. The trunnions being located on opposite sides of the block and so that the axes of the trunnions are located in a line passing through the axis of the shaft 6 and at right angles thereto, endwise tilting movements of the block 12 is prevented upon rotation of the worm 8 against the load that may be brought to bear, tending to prevent rotation of the pin 14 and the yoke 15, which interconnects the pin 14 with the block 12 and moreover prevents any angular movement of the block 12 about the axis of the shaft 6 and consequently the block 12 is securely held in a definite relation to the pin 14, except for the rotative movements of the pin and yoke on the trunnions 13 about the axes of the trunnions.

The ends of the yoke 15 may be secured to the trunnions by means of the bearing blocks 16 and by means of the bolts 17.

The pin 14 is located in a socket 18 that accurately fits the pin 14 so as to permit sliding movements of the pin 14 in the socket. The socket is formed in a shaft 19 and a boss 20 extending from the shaft in a direction away from the shaft 6. The pin 14 is formed of a large cross-sectional area in order to increase the bearing area between the pin and the surface of the socket, and moreover, the socket 18 and the pin 14 extends into the boss 20 for the same reason, that is, to maintain the largest possible bearing area between the pin 14 and the shaft 19. The boss is located on the side of the shaft 19 opposite to that on which the shaft 6 is located in order that the shaft 19 may be brought very close to the shaft 6 to increase the strength of the connection between the two shafts 6 and 19.

The shaft 19 is also supported in the shell 1 and is located in bushings 21 and 22 supported in bosses formed in the casing 1. An arm 23 is keyed or otherwise secured to the shaft 19 whereby the arm 23 may be rotated by the movements of the block 12 caused by rotation of the worm 8 that threads through the block 12.

The block 12 is moved along the worm 8 by rotation of the shaft 6 whereby the pin 14 is tilted about the axis of the shaft 19 and at the same time slid into or out of the socket 18 and causes rotation of the shaft 19. By this arrangement a simple, efficient and exceedingly durable connection is made between the steering wheel of the conveyance and the front wheels of the conveyance, which will withstand the jar and rough usage to which steering gearing of heavy trucks are subjected.

The arm 23 is connected to the part of the steering mechanism connected to the wheels. Movements of the arm 23 is transferred to the wheels in the manner well known in the art.

The shell 1 may be filled with grease or other lubricant. If desired, valve controlled passageways 24 may be formed in the pin 14 to cause movement of the lubricant to the surfaces of the pin and socket. The lower end of the socket is closed by the concave cap plate 25 having the opening 26 and a ball 27 is spring pressed by the spring 28 against the cap plate 25 and covers the opening 26. The spring 28 is of a length sufficient to press against the ball notwithstanding the sliding movements of the pin 14. The spring is located in a hole 29 of sufficient size to receive the spring and the ball. When the pin is raised relative to the shaft 19 the ball is raised a trifle by the suction and the oil or other lubricant enters the lower end of the socket and on the return of the pin the lubricant is forced through the passageway 24 to the bearing surfaces of the pin and the socket.

We claim:—

1. In a steering gear, the combination of a worm, a block for receiving the worm and having bearing trunnions extending on opposite sides of the block, the axes of the trunnions being located in line at right angles to the axis of the worm and extending through the axis of the worm, a yoke having bearing members and clamping bearing blocks forming bearing surfaces at the ends of the yokes and on the blocks, and fitting the trunnions, a pin formed integral with the yoke, a shaft located at right angles to the axis of the worm and at right angles to the pin, and having a boss extending away from the axis of the worm, and having a bearing surface for the pin extending through the shaft and the boss.

2. In a steering gear, the combination of a worm, a block for receiving the worm and having bearing trunnions extending from opposite sides of the blocks, a pin having a yoke, the yoke having bearing surfaces located at its ends and fitting the trunnions, a shaft located at right angles to the axis of the worm and to the pin and having a boss, and a bearing surface for the pin extending through the shaft and boss, a cover for closing the lower end of the boss and having a small opening for permitting a lubricant to enter the interior of the boss, the pin having passageways communicating with its bearing surfaces for lubricating the surfaces.

3. In a steering gear, the combination of a worm, a block for receiving the worm and having bearing trunnions extending from opposite sides of the blocks, a pin having a yoke, the yoke having bearing surfaces located at its ends and fitting the trunnions, a shaft located at right angles to the axis of the worm and to the pin and having a boss, and a bearing surface for the pin extending through the shaft and boss, a cover for closing the lower end of the boss and having a small opening for permitting a lubricant to enter the interior of the boss, the pin having passageways communicating with its bearing surfaces for lubricating the surfaces, and a valve ball for closing the said opening.

In testimony whereof we have hereunto subscribed our names to this specification.

JAMES R. CLARK.
HOWARD A. FLOGAUS.